UNITED STATES PATENT OFFICE.

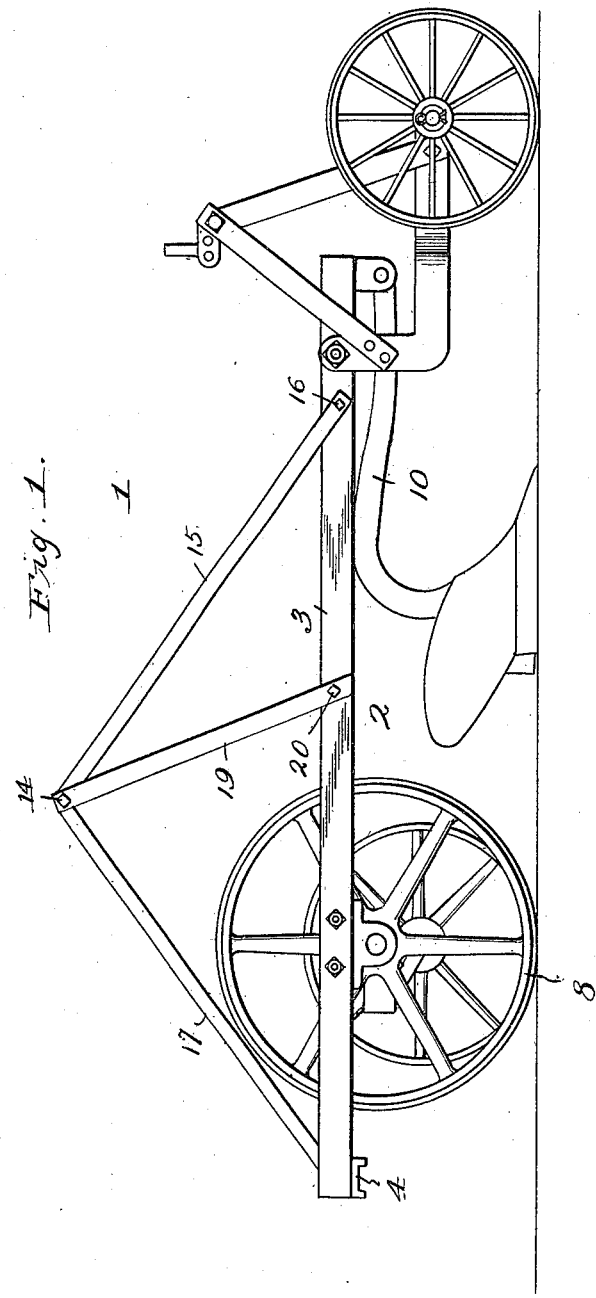

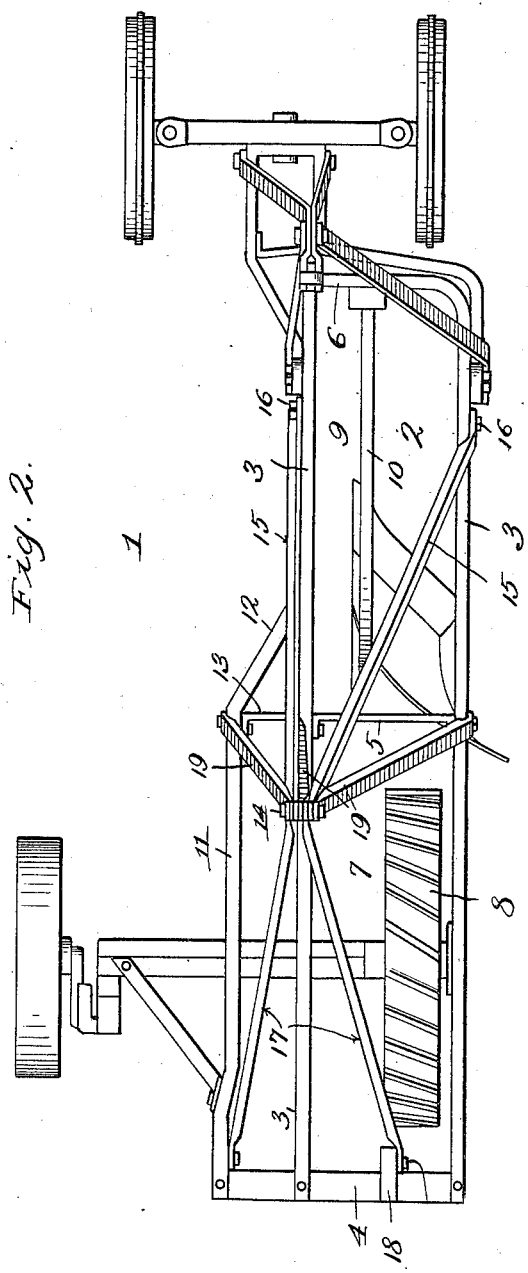

HARRY A. BEAN, OF LEROY TOWNSHIP, BARTON COUNTY, MISSOURI.

FRAME FOR MOTOR-PLOWS.

1,068,559. Specification of Letters Patent. Patented July 29, 1913.

Application filed May 1, 1912. Serial No. 694,553.

*To all whom it may concern:*

Be it known that I, HARRY A. BEAN, a citizen of the United States, residing in Leroy township, in the county of Barton and State of Missouri, have invented certain new and useful Improvements in Frames for Motor-Plows, of which the following is a specification.

My invention relates to improvements in frames for motor plows, and my object is to provide a substantial frame of this character which is reinforced in such manner as to successfully withstand the various strains to which it is subjected, and yet not interfere with the propelling and plow-beam controlling mechanisms of the plow.

In order that the invention may be fully understood, reference will now be made to the accompanying drawings, in which:

Figure 1 shows a side elevation of a plow, provided with my improved frame. Fig. 2 is a plan view of a plow provided with my improved frame.

1 designates a motor plow, such for instance, as that disclosed in my copending application, filed February 5th, 1912, Serial No. 675,475.

2 designates the plow frame, which together, with the reinforcing members therefor, form the important features of the present invention. Said frame is substantially rectangular in form and consists, preferably, of two longitudinal beams 3, a transverse beam 4 connecting the rear ends of beams 3, and a transverse beam 5 connecting the intermediate portions of beams 3, one of which latter is bent transversely at its forward end 6 and suitably secured to the forward end of the companion beam 3. Beam 5 is so spaced as to leave an opening 7 between it and the rear beam 4 to admit the upper portion of a traction-wheel 8. A space 9 is also left between beam 5 and the forward portion 6 of the frame to admit a plow-beam 10 to work up and down.

Frame 2 has a lateral extension at one side thereof to form a support for a motor, such as disclosed by my copending application, hereinbefore referred to. Said extension consists of a beam 11 bent obliquely at its forward portion 12, which is firmly secured to the adjacent beam 3, and secured at its rear end to the transverse beam 4, as shown on Fig. 2. Beam 11 is further secured to the adjacent beam 3 by a short transverse beam 13, arranged in alinement with beam 5 to prevent the beams 3 and 11 from springing either inwardly or outwardly. Frame 2 is firmly braced by superimposed reinforcing members consisting, preferably, of angle-irons, all of which are firmly united at their upper ends by a bolt or rivet 14 at a point above and slightly to the rear of the transverse beams 5 and 13. Said reinforcing-members comprise two long forwardly-inclined members 15, secured at their lower forward ends to beams 3 by rivets 16, two long rearwardly-inclined members 17, one of which is secured to the rear portion of beam 11 and the other to a lug 18 on the transverse beam 4, and three short forwardly-inclined members 19, two of which are connected to beams 3, the other being secured to the forward portion of beam 11, see Fig. 2. By constructing frame 2 of channel-bars and reinforcing it in the manner shown and described, it is obvious that I have produced a rigid frame, well adapted to resist the various strains imposed thereon.

While I have shown and described the preferred construction of my invention, I of course reserve the right to make such changes as properly fall within the spirit and scope of the appended claims.

Having thus described my invention what I claim and desire to secure by Letters Patent, is:

1. In a machine of the character described, a rectangular frame, an intermediate transverse beam dividing said frame into two openings, one to receive a traction-wheel and the other a plow-beam, long forwardly and rearwardly-inclined reinforcing members having upper and lower ends, said upper ends being united and said lower ends being connected to said frame, and short forwardly-inclined reinforcing-members having upper and lower ends, said upper ends being united with the other reinforcing members and said lower ends being secured to intermediate portions of the frame, substantially as shown and described.

2. In a machine of the character described, a rectangular frame, a lateral extension on said frame to support a motor, said extension being parallel the greater portion of its lengths with said frame, and forwardly and rearwardly-inclined reinforcing members having upper and lower ends, said upper ends being united and said lower ends being connected to the frame and the lateral extension thereof, substantially as shown and described.

In testimony whereof I affix my signature, in the presence of two witnesses.

HARRY A. BEAN.

Witnesses:
F. G. FISCHER,
E. C. LILLIAN.

Copies of this patent may be obtained for five cents each, by addressing the "Commissioner of Patents, Washington, D. C."